METHOD OF PREPARING INDIUM ANTIMONIDE FILMS

Filed April 5, 1961

INVENTORS
BENJAMIN C. HARRISON
EDWIN H. TOMPKINS
BY Leo J. Aubel
ATTORNEY

United States Patent Office 3,101,280
Patented Aug. 20, 1963

3,101,280
METHOD OF PREPARING INDIUM ANTIMONIDE FILMS

Benjamin C. Harrison, Edmonton, Alberta, Canada, and Edwin H. Tompkins, Berwyn, Ill., assignors, by mesne assignments, to International Business Machines Corporation, Endicott, N.Y., a corporation Filed Apr. 5, 1961, Ser. No. 100,969
4 Claims. (Cl. 117—201)

This invention relates to the method of preparing thin films and more particularly to a method for preparing thin films of stoichiometric indium antimonide.

Thin films of semiconductors can be made by several techniques, but the preparation of stoichiometric films of binary compounds, such as indium antimonide, is difficult. It has been found that vacuum evaporation of a compound such as indium antimonide usually results in a film which does not possess true stoichiometric properties and is, therefore, unsuitable for semiconductor applications; apparently during evaporation, fractionation of the components takes place and the deposited film has a composition different from that of the original material. Assuming a beam of molecules, some of the molecules acquire velocity components in directions off the axis of the beam because of collisions, and the magnitudes of these components are a function of molecular weight. In a vapor beam comprising indium antimonide, for example, indium atoms are deflected more than indium antimonide or antimony molecules. Although the excess of a volatile element can be removed from a deposited film by heating, this is not a completely satisfactory procedure since the loss of the volatile element leaves many imperfections, even if considerable recrystallization takes place. Therefore, a method is required which obtains deposition of a stoichiometric composition in all stages of film formation.

Accordingly, it is a principal object of the present invention an improved method for forming stoichiometric films of indium antimonide.

It is another object of the invention to provide an improved method for forming stoichiometric films of indium antimonide by vapor techniques which films are suitable for use in semiconductor devices.

It is yet another object of the present invention to provide an improved method for forming indium antimonide films which method is usable in commercial production of semiconductor devices.

In one form, the invention provides an improved method of forming a stoichiometric indium antimonide film comprising the steps of reacting the vapors of indium trimethyl and stibine at about room temperature over a stable substrate to form a film of a co-ordination compound, and heating said compound at 150° C. or higher to eliminate methane and form an indium antimonide film.

The foregoing and other objects, features and advantages of the invention will be apparent from the following more particular description of a preferred embodiment of the invention, as illustrated in the accompanying drawings.

As noted above, indium antimonide films have heretofore been formed by vacuum evaporation of the compound. However, because of dissociation in the vapor, the deposited films have poor electrical characteristics, and they usually deviate from stoichiometric composition.

A principal feature of the method according to the invention is that the vapors of trimethylindium or indium trimethyl, $In(CH_3)_3$, and stibine, $SbH_3$, are reacted at about room temperature over a stable substrate to provide a film having a composition suitable for conversion to a useful stoichiometric semiconductor. The general method is indicated in the block diagram of FIG. 2.

Preparatory to utilizing the method of the invention, trimethylindium is prepared by the reaction of dimethylmercury with indium, as is known in the art; stibine is prepared by the hydrolysis of magnesium antimony in concentrated hydrochloric acid and purified by fractional distillation and condensation, as is also known in the art.

Figure 1:
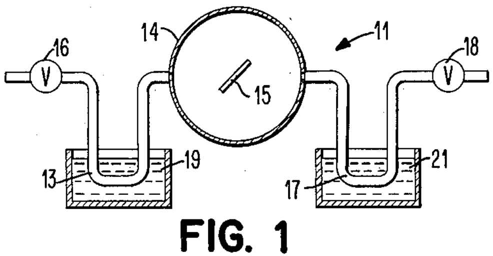
FIG. 1 shows a schematic drawing of an apparatus for practicing the method or process according to the invention.

Referring to FIG. 1, the system 11 in which the stibine and trimethylindium are reacted comprises a first trap or bight portion 13, a reaction chamber 14 in which a substrate 15 to be plated is positioned, and a second trap or bight portion 17. The substrate 15 may be of glass, quartz, silicon or other material on which a semiconductive film can be deposited.

The system 11 is initially evacuated. Chamber 14 is maintained at room temperature. The first cycle of the process is then initiated.

Figure 3:
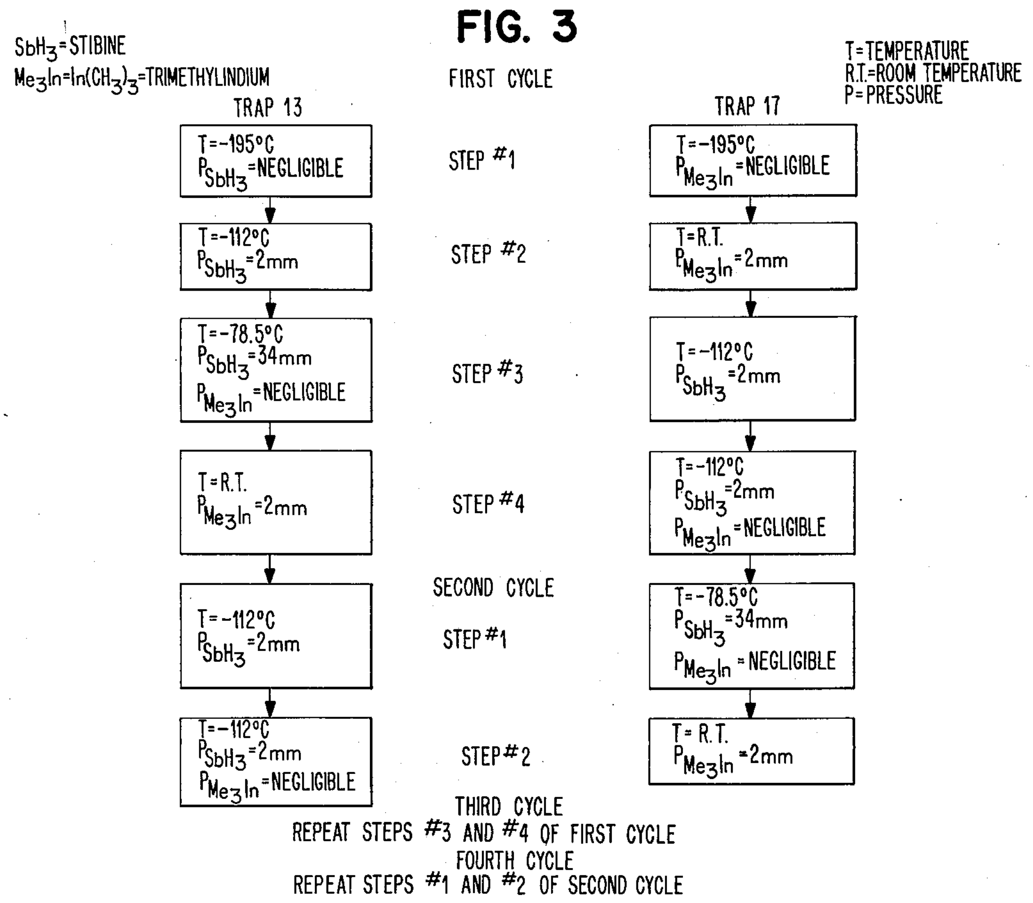
FIG. 3 shows a block diagram of the detailed steps of the method of the invention.
Figure 2:
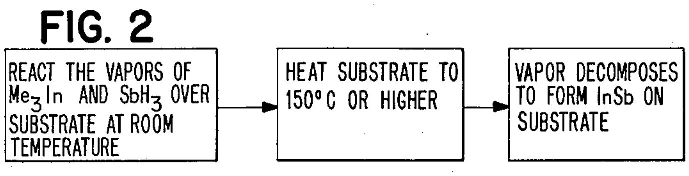
FIG. 2 shows a block diagram illustrative of the general method of the invention.

FIG. 2 shows in block diagram form the process of the invention. In FIG. 3, the process is arbitrarily divided into cycles and steps to facilitate the explanation.

Stibine is introduced through suitable valve means 16 to the trap 13 in the left-hand end, as oriented in FIG. 1 of reaction system 11. Trimethylindium is introduced through suitable valve means 18 to the trap 17 in the right-hand end of the system 11. The trap 13 is surrounded by a bath 19 of liquid nitrogen to decrease the temperature of the stibine to −195° C.; the pressure of the stibine will become negligible. The trap 17 is surrounded by a bath 21 also of liquid nitrogen to also decrease the temperature of trimethylindium to −195° C.; the pressure of the trimethylindium will also be negligible At this point, stibine is condensed in trap 13 and trimethylindium is condensed in trap 17 while the system is evacuated (step #1).

Next (step #2), bath 19 is removed from trap 13 and a second bath similar to bath 19 but containing, say carbon disulfide, is substituted therefor. The carbon disulfide bath causes the temperature of the trap 13 to rise to −112° C.; the pressure of stibine will increase to about 2 mm. The stibine will tend to move toward chamber 14. At the same time, bath 21 is removed from trap 17 and the temperature of the trimethylindium increases to room temperature; the pressure of the trimethylindium will increase to about 2 mm. The trimethylindium will move from the warmer area of trap 17 through the chamber 14 toward trap 13; this step is continued until all the trimethylindium is depleted from trap 17 which can be indicated by suitable manometers.

The stibine and trimethylindium will react in chamber 14 to produce a co-ordination compound or, more specifically, a non-volatile orange film on substrate 15. Essentially, the foregoing comprises a complete process; however, to obtain films of thicker dimensions the cycling operation is continued.

As noted, during the foregoing steps, the trimethylindium will be moved out of trap 17 and will condense in the trap 13. Both trimethylindium and stibine will now be in trap 13; stibine will have a pressure of about 2 mm.; the pressure of the trimethylindium will be negligible and the trimethylindium will condense.

At this point in the process, trap 13 is at −112° C. and trap 17 is at room temperature. The second bath of carbon disulfide is now removed from trap 13 and a third bath, which may be composed of Dry Ice, is provided for trap 13 (step #3). Dry Ice changes the temperature of trap 13 to −78.5° C.; the pressure of stibine will be about 34 mm. At the same time that the Dry Ice bath is placed around trap 13, a bath of carbon disulfide is placed around trap 17 to decrease the temperature of trap 17 to −112° C. As noted, at −112° C., the pressure of stibine is 2 mm.; since stibine pressure in trap 13 is relatively high (34 mm.) with respect to trap 17 (2 mm.), all the stibine will move relatively fast out of trap 13 toward trap 17.

After the stibine is transferred out of trap 13, as can be indicated by suitable manometers, the carbon disulfide bath around trap 13 is removed and trap 13 is permitted to warm to room temperature (step #4). The trimethylindium will move from the warmer area of trap 13 through the reaction chamber 14 to the trap 17 which is at −112° C. The trimethylindium will react with stibine in the chamber 14 to cause a second coating of a film to be formed on substrate 15.

The second cycle is then initiated by placing a Dry Ice bath at −78° C. on trap 17 to cause all the stibine to transfer out of trap 17; at this point, trap 13 is at a −112° C. Next, the bath at −78° C. is removed from trap 17 and the temperature of trap 17 is permitted to increase to room temperature; the pressure of the trimethylindium is 2 mm. The trimethylindium will move from the warmer area of trap 17 through chamber 14 toward trap 13. The trimethylindium will react with the stibine in chamber 14 to form another layer of film on substrate 15.

As shown in FIG. 3, the third cycle repeats steps #3 and #4 of the first cycle, and the fourth cycle repeats the two steps of the second cycle. The fifth cycle repeats the third cycle; the sixth cycle repeats the steps of the fourth cycle, etc. As many cycles as necessary to provide a film of the desired thickness are made.

After a film of desired thickness is obtained, the substrate is heated to 150° C. or hotter. The film formed on the substrate decomposes at about 150° C. to a shiny black film which is essentially indium antimonide (InSb).

The chemical reaction is believed to be:

$$InMe_3 + SbH_3 \xrightarrow{\text{Room temperature}} Me_2InSbH_2 + CH_4$$

$$Me_2InSbH_2 \xrightarrow{\text{Heat to } 150^\circ \text{ C.}} InSb + 2CH_4$$

(Note: $Me = CH_3$)

Control of the partial pressure of stibine is important since, at higher pressures, antimony metal may be formed; it has been found that when a stibine pressure of 2 mm. is maintained, a stoichiometric film is formed.

If the deposition of the film is attempted at temperatures above normal room temperature, excess free antimony deposits and the film produced by the heating at 150° C. or higher does not provide stoichiometric indium antimonide. The presence of excess antimony is inferred from the fact that stibine alone deposits antimony at temperatures above 35° C., and the deviation from stoichiometry in the films is indicated by small variation in resistance with temperature changes which are characteristic of metallic conduction. Stoichiometric films formed in accordance with the invention increase in resistance by a factor of about 100 when cooled from 300° K. to 77° K.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of forming semiconductive films on a substrate placed in an evacuated chamber comprising the steps of, reacting vapors of trimethylindium and stibine over said substrate at room temperature and at a pressure of about 2 mm. to form a coating on said substrate and heating said substrate to a temperature in the range of 150° C. for decomposing said coating to form an indium antimonide film on said substrate.

2. A method of forming semiconductive films on a substrate utilizing a system including a reaction chamber and first and second traps comprising, the steps of, evacuating said system, placing a substrate to be coated in said reaction chamber, maintaining said chamber at room temperature, introducing stibine into said first trap, cooling and thereby condensing said stibine in said first trap, introducing trimethylindium into said second tray, cooling and thereby condensing trimethylindium in said second trap, raising the temperature of said stibine to vaporize said stibine and to increase the vapor pressure of said stibine to about 2 mm., channeling said vaporized stibine from said first trap into said chamber, raising the temperature of said trimethylindium to vaporize said trimethylindium and to increase the vapor pressure of said trimethylindium to about 2 mm., channeling said vaporized trimethylindium from said second trap into said chamber, whereby said stibine and said trimethylindium react in said chamber to form a coating on said substrate, and heating said substrate to a temperature in the range of 150° C. for thermally decomposing said coating to form stoichiometric films of indium antimonide on said substrate.

3. A method of forming semiconductive films on a substrate utilizing a system including a reaction chamber intermediate a first and a second trap comprising the steps of evacuating said system, maintaining said reaction chamber at room temperature, introducing stibine into said first trap, cooling and thereby condensing stibine in said first trap, introducing trimethylindium into said second trap, cooling and thereby condensing trimethylindium in said second trap, raising the temperature of said first trap to increase the stibine vapor pressure to about 2 mm. whereby stibine tends to pass into said reaction chamber, raising the temperature of said second trap to increase the trimethylindium vapor pressure to about 2 mm. whereby the trimethylindium moves from the higher temperature area of said second trap through the reaction chamber to said first trap to cause the stibine and trimethylindium to react in said chamber to form a coating on said substrate, raising the temperature of said first trap to increase the vapor pressure of the stibine to about 34 mm. to cause said stibine to move out of said first trap toward said second trap whereby the trimethylindium will be in said first trap and the stibine will be in said second trap, raising the temperature of said first trap to increase the vapor pressure of trimethylindium to about 2 mm. wherein said trimethylindium will begin to transfer back through said reaction chamber to said second trap and stibine will move into said reaction chamber whereby the stibine and trimethylindium will react to provide a second coating on said substrate.

4. A method according to claim 3 and including the step of heating the film formed on said substrate to approximately 150° C. to form an indium antimonide film.

References Cited in the file of this patent

UNITED STATES PATENTS

| | | |
|---|---|---|
| 869,013 | McQuat | Oct. 22, 1907 |
| 2,701,216 | Seiler | Feb. 1, 1955 |
| 2,778,743 | Bowman | Jan. 22, 1957 |
| 2,938,816 | Gunther | May 31, 1960 |